M. D. Whipple.
Wool and Cotton Cleaner.
No: 140. Reissued Jul: 31, 1849.
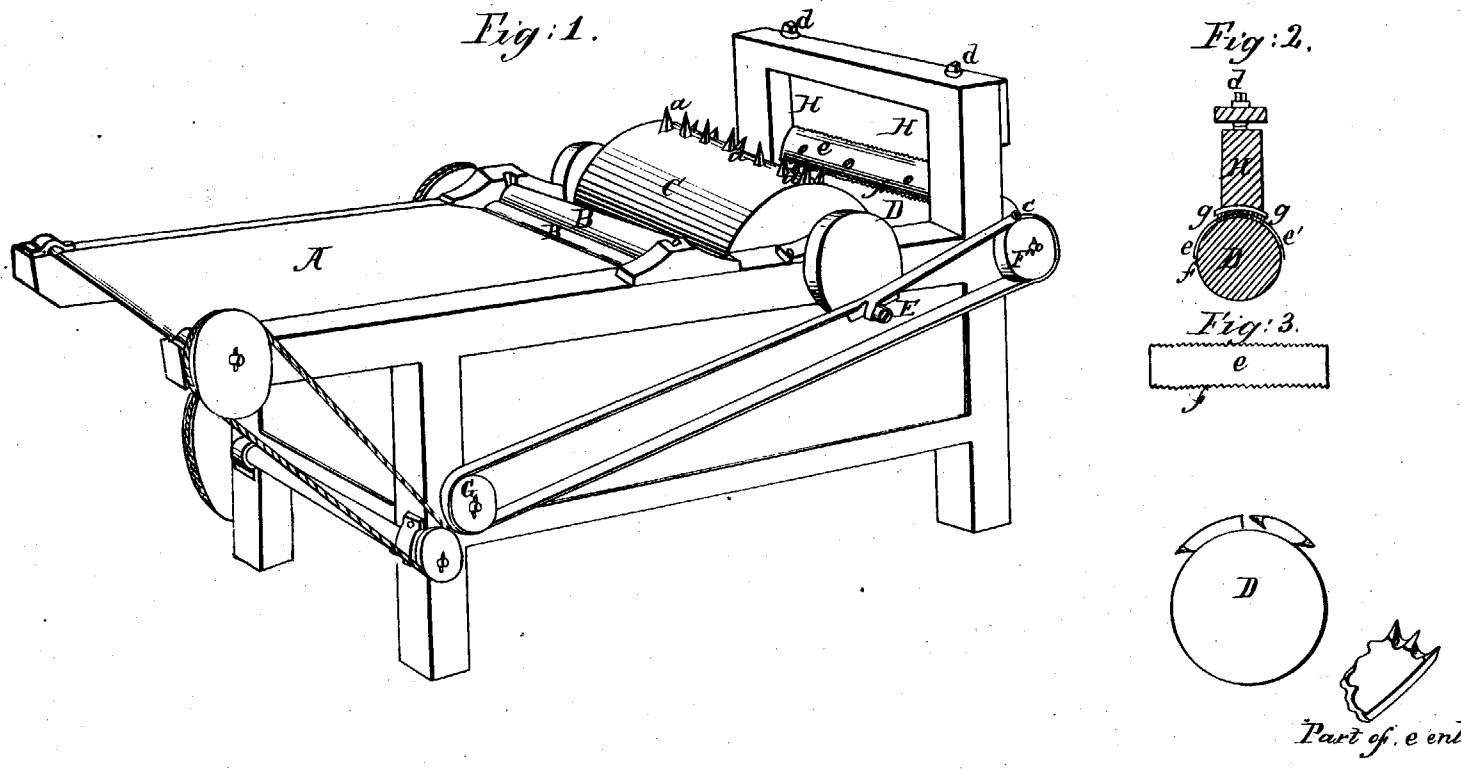
N. PETERS, PHOTO-LITHOGRAPHER, WASHINGTON, D. C.

UNITED STATES PATENT OFFICE.

MILTON D. WHIPPLE, OF LOWELL, MASSACHUSETTS.

IMPROVEMENT IN MACHINES FOR CLEANING WOOL FROM BURRS.

Specification forming part of Letters Patent No. 1,839, dated October 28, 1840; Reissue No. 140, dated July 31, 1849.

*To all whom it may concern:*

Be it known that I, the undersigned, MILTON D. WHIPPLE, of Lowell, in the county of Middlesex, formerly of East Douglas, in the county of Worcester, in the State of Massachusetts, machinist, have invented a new and useful Machine for Cleaning Wool, Cotton, and other Similar Fibrous Substances, of which the following is a full, true, and exact description, viz:

In the accompanying drawings, Figure 1 is a perspective view of my machine. A is the feeding-apron upon which the wool or cotton to be cleaned or to be picked is to be placed. This apron passes around rollers in the usual way. B B are the feeding-rollers, and C is a cylinder set with spikes to take the wool from the feeding-rollers, and carry it to the vibrating doffer or comb-roller, by aid of which the picking or cleaning is effected. The feeding part above described is the same with that used in the ordinary wool-picker; but the cylinder C is set with feeding-spikes over but a portion of its periphery, as the combs, which constitute one of the main features of my improvement, are to receive their supply of wool at intervals only. Three or four rows of spikes, as shown at *a a a*, are as many as need to be placed upon the cylinder when only two or three combs are used. D D is the comb, roller, or vibrating doffer, which stands at the distance of about half an inch from the feeding-spikes. This roller may be made to vibrate in various ways; but that which is represented in the drawings is at once simple and efficient. The cylinder-shaft has a crank-pin, E. Upon the vibrating doffer-shaft there is a pulley, F, and to this a strap or band is fastened by a screw or pin, as at C. This strap passes around the friction-pulley G, and its two ends are fastened to the crank-pin E, the effect of which will be to cause the doffer to vibrate by the revolving of the cylinder C, and this vibration should be equal to the space that is covered with combs, and can be determined either by the size of the wheel or pulley F, or by the throw of the crank. The doffing-roller may be three inches (more or less) in diameter, and upon this roller I affix a combination of teeth and smooth surface. These teeth may be made in various ways, but I prefer the plan of combs reaching lengthwise of the roller; but the main object is to have both teeth and surface in combination, the teeth to seize and hold the fibers and the smooth surface to aid (the guard hereinafter mentioned) in detaching the burrs and other impurities from the wool or seeds from cotton. There may be two or more combs, and these combs are usually made by screwing steel plates upon a roll, and then turning the outer surface off true in the lathe. These plates are then taken off and teeth about one-eighth of an inch deep filed in the edge of each comb. These teeth may be a tenth of an inch apart. They are to be sharpened up from the under side of the plates, so that their points will be flush with the outer surface of the cylinder, or nearly so; or, in other words, their extreme points will be flush with the outer convex surface of the comb. These combs being secured in their places after their teeth are made, strips of paper or pasteboard may be placed below their front edges, or the back edge of the preceding comb may be slightly filed off, in order that the teeth may take hold of the wool, but not too rankly. The teeth, when thus protected by the preceding plain surface, will not get hold of burrs and seeds to tear them in pieces, nor get injured by hard substances that are common in many foreign cheap wools. These protected teeth form an essential feature in my machine. These teeth differ from the teeth of a common card by having greater strength combined with sharpness, and from the teeth of the saw-gin in being combined with a convex smooth surface to facilitate the removal of burrs and seeds. To cause the vibrating doffer to bring back the matted locks that cannot pass through under the guard, hereinafter described, I cut teeth upon the back edge of the last comb, whereby any locks that have not passed under the guard are thrown back upon the cylinder of spikes to be operated upon again and again till they are reduced and the fibers are carried through the machine by degrees, leaving the burrs and seeds to fall down through the grates under the cylinder of spikes or main cylinder. This repeated action upon the large locks and matted masses, while the small ones pass through immediately, constitutes another essential feature in my machine. Above the comb-doffer I place a guard, (shown at H H,) which guard extends from end to end of the doffer, and may be raised or lowered by set-screws *d d* to effect the degree of cleanness that may be wanted. Along the lower edge of this guard there is affixed a steel plate armed with teeth similar to those on the plates of the doffer, and pointing forward toward the front or leading part of the machine. These teeth lay hold of the wool or cotton, and prevent them from passing back into the machine, thus keeping all that has passed through on the front side till it finally falls down in front of the machine. The guard-plate is fitted to the curvature of the doffer, so as to accurately fit it.

Fig. 2 is a transverse section of the doffer and the guard above it. *e e* are the comb-plates, affixed to the doffer and armed with teeth on their fore edges and on both edges of the last comb, as at *f*. At *g g*, on the lower side of the guard H, is the steel guard-plate, having teeth on its back edge, in order to prevent the cleaned wool from returning.

Fig. 3 shows the comb-plate with teeth on both edges. The wool or cotton, being placed upon the apron, passes through between the feeding-rollers, and is carried to the doffer by the action of the spikes on the main cylinder. These spikes pass within about half an inch or less from the doffer, and thus usually prevent any very large locks from being carried against the guard. Such locks, being carried forward by the spikes, pass round again and again over the grates by the revolution of the main cylinder. These locks are easily thus carried forward, because of the thin sheet of wool that is held by the comb-teeth. The vibration of the doffer must be to that extent that all the combs will pass through under the guard and bring the wool or cotton beyond the teeth on the guard-plate, these teeth preventing its return. As the doffer vibrates forward, the burrs or seeds are detained by the guard. The comb-teeth, being protected by a plain surface immediately before them—that is, by the back of the last or preceding comb—take but a very shallow hold, the fibrous material causing a very thin sheet, layer, or thickness of fibers to adhere to them, and they thus pick the wool out of the burrs, and are prevented from taking hold of the burrs and seeds and from taking too rank hold of matted locks. The wool which is not detached and carried forward by the comb-teeth on coming in contact with them at first is successively subjected to a loosening operation by the repeated revolutions of the main cylinder, till finally all the clean fibers have passed through under the guard and all the burrs, seeds, and other foreign matter have fallen down through the grates, thus effecting the purpose of cleaning with but little injury to the fiber. The teeth of the guard are not absolutely necessary for preventing a return of the wool; but in a vibrating machine they are the best and cheapest remedy. They are not absolutely necessary to clean off the wool, as the brush that is commonly used in the saw-gin may be substituted.

Having thus fully described the nature and operation of my machine for cleaning wool, cotton, and other fibrous substances, I proceed to state what I claim as my invention and improvements.

I claim—

1. The machine as a whole, consisting in general of the constituent parts in combination as above described, and that though equivalents may be substituted for some of those parts for like purposes and substantially the same by the combination of the common feeding and picking apparatus with the comb-toothed cylinder.

2. Forming and arranging the teeth of cylinders for burring wool and cleaning cotton and other fibrous substances in such a manner that their outer convex sides shall be substantially concentric with the axis of the cylinder for the purpose of seizing and holding the fibers, and presenting a surface against which the guard can act in removing burrs and other foreign matter therefrom.

MILTON D. WHIPPLE.

In presence of—

JAS. DINSMOOR,

ARTHUR P. BONNEY.